US011729888B2

(12) United States Patent
Knoop et al.

(10) Patent No.: US 11,729,888 B2
(45) Date of Patent: Aug. 15, 2023

(54) METHOD FOR PERFORMING AN ANIMATION WITH A LIGHTING DEVICE COMPRISING A PLURALITY OF LIGHT SOURCES

(71) Applicant: Hella GmbH & Co. KGaA, Lippstadt (DE)

(72) Inventors: Sarah Knoop, Salzkotten (DE); Andre Schellbach, Lippstadt (DE); Jeremias Spiegel, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/294,606

(22) PCT Filed: Nov. 30, 2018

(86) PCT No.: PCT/EP2018/083186
§ 371 (c)(1),
(2) Date: May 17, 2021

(87) PCT Pub. No.: WO2020/108779
PCT Pub. Date: Jun. 4, 2020

(65) Prior Publication Data
US 2022/0015211 A1 Jan. 13, 2022

(51) Int. Cl.
*H05B 47/155* (2020.01)
*B60Q 1/30* (2006.01)
*G06T 13/20* (2011.01)

(52) U.S. Cl.
CPC ............ *H05B 47/155* (2020.01); *B60Q 1/30* (2013.01); *G06T 13/20* (2013.01)

(58) Field of Classification Search
CPC ...... H05B 45/10; H05B 47/155; H05B 47/11; B60Q 1/30; G06T 13/10; G06T 13/20
See application file for complete search history.

(56) References Cited

U.S. PATENT DOCUMENTS

| 11,232,321 B2 * | 1/2022 | Harrison | H05B 45/20 |
| 2006/0002110 A1 * | 1/2006 | Dowling | F21V 23/005 |
| | | | 362/249.05 |
| 2007/0183152 A1 * | 8/2007 | Hauck | H05B 45/345 |
| | | | 362/249.11 |

(Continued)

FOREIGN PATENT DOCUMENTS

| WO | 2018/127378 A1 | 7/2018 | |
| WO | WO-2018127378 A1 * | 7/2018 | ......... H05B 37/0245 |

OTHER PUBLICATIONS

European Office Action dated Apr. 5, 2023, issued in corresponding European application.

*Primary Examiner* — Abdullah A Riyami
*Assistant Examiner* — Syed M Kaiser
(74) *Attorney, Agent, or Firm* — Husch Blackwell LLP

(57) ABSTRACT

Method is provided for performing an animation with a lighting device having a plurality of light sources. An animation is described in a description language that describes at least parts of the animation as movement of an animation object in at least one spatial dimension in a virtual coordinate system. The animation described in the description language is interpreted by a control device controlling the plurality of light sources such that the light sources perform the animation.

20 Claims, 1 Drawing Sheet

(56) References Cited

U.S. PATENT DOCUMENTS

| | | | |
|---|---|---|---|
| 2013/0222433 A1* | 8/2013 | Chapman | G06T 13/40 345/660 |
| 2015/0154783 A1* | 6/2015 | Grundhofer | G03B 21/562 348/745 |
| 2020/0037418 A1* | 1/2020 | Kasle | H05B 45/20 |

* cited by examiner

METHOD FOR PERFORMING AN ANIMATION WITH A LIGHTING DEVICE COMPRISING A PLURALITY OF LIGHT SOURCES

CROSS REFERENCE

This application claims priority to PCT Application No. PCT/EP2018/083186, filed Nov. 30, 2018, the entirety of which is hereby incorporated by reference.

FIELD OF THE INVENTION

This invention concerns a method of performing an animation using a lighting device comprising a plurality of light sources, in particular a lighting device for a motor vehicle. This invention also concerns a control device for controlling a plurality of light sources of a lighting device.

BACKGROUND

Methods, control devices and lighting devices of the above type are known. A typical example of such a lighting device is an intermittent flashing light or a flashing light with a so-called wiping effect. This is a flashing light of a motor vehicle with a number of light sources which can be controlled by a control device and which are arranged next to each other in a horizontal direction, for example. With such a flashing light, an animation can be carried out in which the light sources are switched on one after the other from the inside to the outside.

A disadvantage of such lighting devices, control devices and methods is that the microcontrollers normally used as control devices have only limited memory space. Furthermore, the animations to be carried out are written discretely in time tables or stored in the memory of the control device. On the one hand, the time-discrete tabular description of non-equidistant light sources, for example, is difficult. On the other hand, the effort for the description increases strongly with the number of light sources. Furthermore, subsequent changes are difficult to implement. In addition, the number of animations that can be performed or the number of light sources that can be controlled is limited by the available memory space.

SUMMARY OF THE INVENTION

The problem underlying the present invention is the indication of a method, a control device and a lighting device of the type referred to above, in which the description of an animation requires less memory space.

The method may include the following method steps:

Describing an animation in a description language that describes at least parts of the animation as movement of an animation object in at least one spatial dimension in a virtual coordinate system, Interpretation of the animation described in the description language by a control device controlling the plurality of light sources such that the light sources perform the animation.

By using such a description language, the required storage space is reduced, in particular minimized. Furthermore, the description language makes the type of animation intuitively describable. In addition, the distance between the light sources is not relevant for the storage requirement. The animation can therefore be described resolution-independently. A further advantage is that the description language provided for in the invention allows the generic implementation of an interpreter on different platforms such as a microcontroller or a domain computer.

It may be provided that the animation is described in the description language by at least two movements and a pause taking place between the movements. In particular, any movements and pauses can be arranged in series.

It is possible that the animation object corresponds to a shape in the virtual coordinate system which may in particular have properties such as a filling and/or a brightness and/or a colour and/or a texture. For example, a pictogram can be selected as the filling, so that the lighting device can generate a moving pictogram, for example.

It is possible that a plurality of different animation objects are provided in the description language, each of which is assigned a unique identifier. By selecting another animation object, the character of the animation can be changed by simple means.

It can be provided that in the description language a parameter used to describe the animation is the time within which a movement of the animation object is to be completed. The method offers a simple adjustment of the parameters of the animation to change the experienceability. The experience can be significantly changed in particular by changing the parameter affecting the time.

It can be provided that in the description language a parameter used to describe the animation is a target position indicated in the virtual coordinate system to which the animation object is to be moved. By specifying a target position it is relatively easy to specify the movement of the animation object along the direct path from a current starting position to the target position.

It is possible that in the description language a parameter used to describe the animation is a rotation of the animation object to be performed and/or that in the description language a parameter used to describe the animation is a scaling of the animation object to be performed. Rotations and resizing of the animation object provide more ways to easily change the animation.

It can be provided that in the description language a parameter used to describe the animation is the transition behaviour with which a movement of the animation object is to be started and/or completed. The impression created by the animation can also be influenced relatively easily by specifying the transition behaviour.

Claim 9 provides that the control device can interpret an animation described by the method according to the invention in the description language and can control the plurality of light sources in such a way that the light sources perform the animation, in particular information which is used for the interpretation being stored in the memory.

Claim 10 provides that the control device is a control device according to the invention.

DETAILED DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
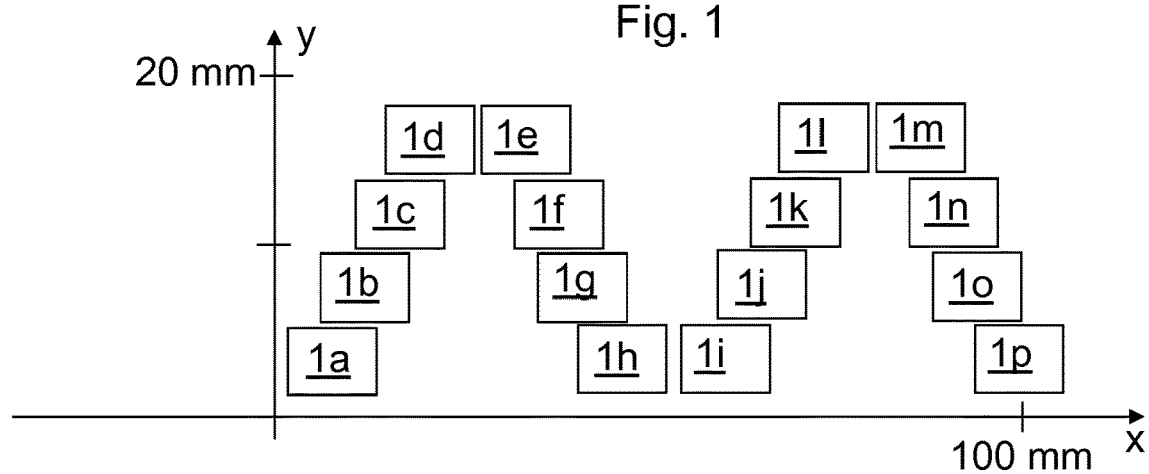
FIG. 1 is a schematic representation of an array of a plurality of light sources in a coordinate system with which a method according to the invention is to be carried out.

In the drawings the same or functionally the same parts are provided with the same reference signs.

A plurality of light sources $1a$ to $1p$ of a lighting device (not shown) shall perform an animation which is carried out with a method according to the invention. The light sources $1a$ to $1p$ are shown schematically as rectangles in FIG. 1. Light sources $1a$ to $1p$, for example, can be transparent or semi-transparent plastic parts or sections of a plastic cover backlit by a light-emitting diode (LED).

For the description of the animation a description language is used, which describes the animation as a movement of an animation object in a virtual coordinate system. The coordinate system shown in FIG. 1 should essentially correspond to physical reality. Light sources $1a$ to $1p$ may, for example, be located in the illuminating device on a curved surface of a rear light of a motor vehicle. This possibly three-dimensional coordinate system is converted into a virtual coordinate system shown in FIG. 2, which has only two spatial dimensions. It is also possible to provide only one dimension instead of two dimensions.

Figure 2:
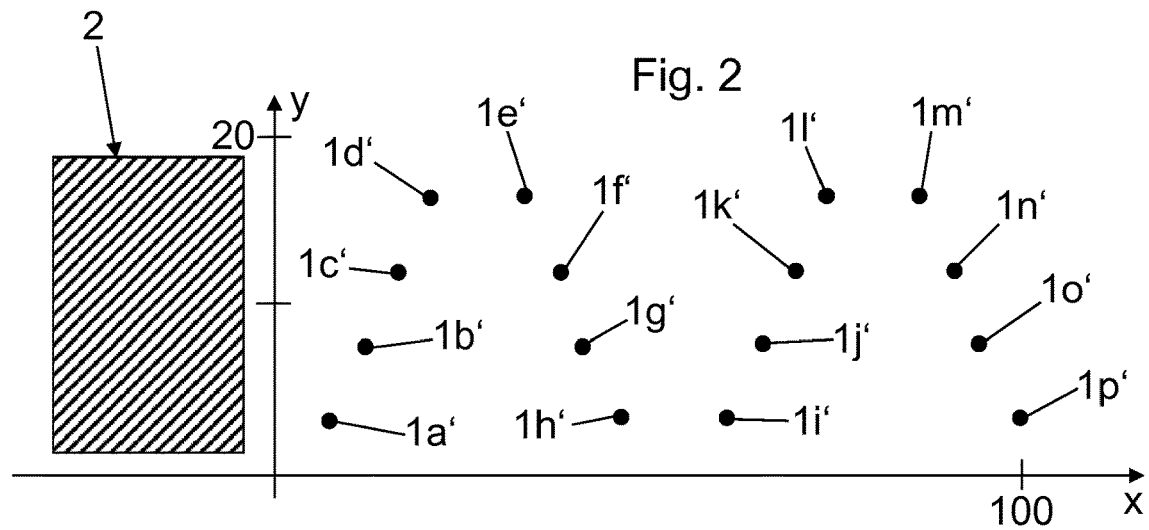
FIG. 2 is a representation of the arrangement according to FIG. 1 in a virtual coordinate system together with an animation object.

In the virtual coordinate system according to FIG. 2, the light sources $1a$ to $1p$ are shown as points $1a'$ to $1p'$ only. Furthermore, an example animation object 2 is shown, whose outer form corresponds to a rectangle.

The description language uses a number of parameters to describe the motion of animation object 2 in the virtual coordinate system according to FIG. 2. An example of the description language is:

trans id time x y r sx sy easing

The parameter "trans" indicates that a movement is to be carried out. For example, instead of "trans", "pause" can be used to indicate that a pause, especially a pause between two movements, should be performed.

The parameter "id" specifies which animation object should be moved. For this purpose, each of the animation objects to be used is assigned an identifier or an "id number".

The "time" parameter specifies the time within which the movement is to be completed.

The parameter "x" indicates the x-coordinate of a target position in the virtual coordinate system according to FIG. 2. The parameter "y" specifies the y-coordinate of a target position in the virtual coordinate system according to FIG. 2.

The parameter "r" indicates whether animation object 2 should be rotated around its centre.

The parameter "sx" indicates whether the animation object should be scaled with respect to the x-coordinate of the virtual coordinate system according to FIG. 2. The parameter "sy" indicates whether the animation object should be scaled with respect to the y-coordinate of the virtual coordinate system according to FIG. 2.

The "easing" parameter specifies how the transition behaviour between two movements or a movement and a pause is to be selected. For example, a linear, an exponential, a cubic one or other transition behaviour can be selected.

It is possible to provide for further parameters. For example, the animation objects 2 to be moved can have properties such as a filling and/or a brightness and/or a colour and/or a texture. For example, a pictogram can be selected as the filling. For one, several or each of these properties, corresponding parameters can be used.

The lighting device not shown comprises a control device capable of controlling the plurality of light sources $1a$ to $1p$. The control device can, for example, be designed as a microcontroller. The control device comprises a processor and a memory. The information used to interpret the animation described in the description language is stored in the memory. For example, information on various animation objects can be stored in the memory.

Below is an example of an animation written in the description language described. The parameters have the values:

trans 17 2000 100 10 0 1 1 lin

"trans 17" specifies that a movement of the animation object with the id number 17 is intended. In this example, the animation object with the id number 17 corresponds to the rectangular animation object 2 shown in FIG. 2.

This animation object 2 is to be moved in a time span of 2000 ms (time=2000) to a target position in the virtual coordinate system according to FIG. 2 with the coordinates x=100 and y=10. Neither a rotation (r=0) nor a scaling (sx=1 and sy=1) should take place. A linear transition behaviour (easing=lin) is to be selected as the transition behaviour.

Figure 3A:
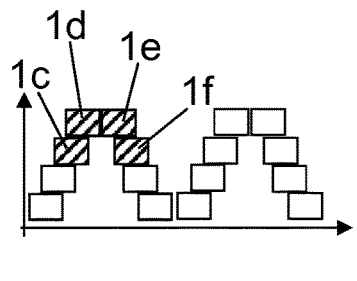
FIG. 3a illustrates the arrangement in the representation according to FIG. 1 at a first time of the animation.
Figure 4A:
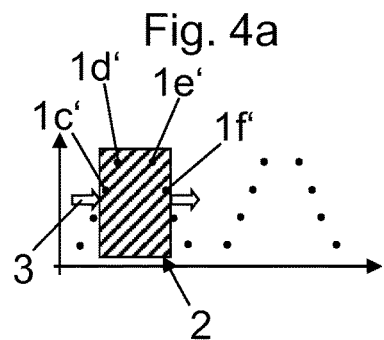
FIG. 4a illustrates the arrangement in the representation according to FIG. 2 at the first time of the animation.
Figure 4B:
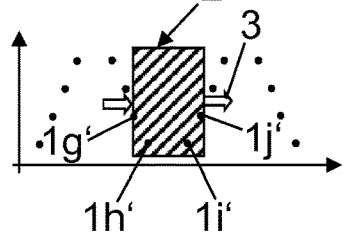
FIG. 4b illustrates the arrangement in the representation according to FIG. 2 at the second time of the animation.
Figure 4C:
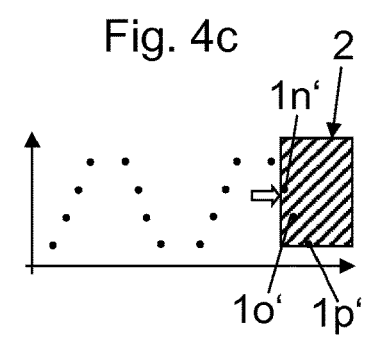
FIG. 4c illustrates the arrangement in the representation according to FIG. 2 at the third time of the animation.

FIG. 4a to FIG. 4c illustrate this movement. FIG. 4a shows the animation object 2 at a first point in time that corresponds to a time of 500 ms after the start of the animation. At this first point the animation object 2 covers the points $1c'$, $1d'$, $1e'$ and $1f'$ in the virtual coordinate system. Accordingly, the control device controls light sources $1c$, $1d$, $1e$ and $1f$ associated with points $1c'$, $1d'$, $1e'$ and $1f'$ to emit light. This is indicated in FIG. 3a by a hatching of the light sources $1c$, $1d$, $1e$ and $1f$, which corresponds to the hatching of the animation object 2.

Figure 3B:
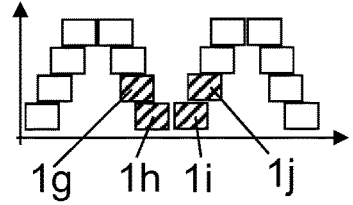
FIG. 3b illustrates the arrangement in the representation according to FIG. 1 at a second time of the animation.

FIG. 4b shows the animation object 2 in a second point in time, which corresponds to a time of 1000 ms after the beginning of the animation. At this second point the animation object 2 covers the points $1g'$, $1h'$, $1i'$ and $1j'$ in the virtual coordinate system. Accordingly, the control device controls the light sources $1g$, $1h$, $1i$ and $1j$ associated with points $1g'$, $1h'$, $1i'$ and $1j'$ to emit light. This is indicated in FIG. 3b.

Figure 3C:
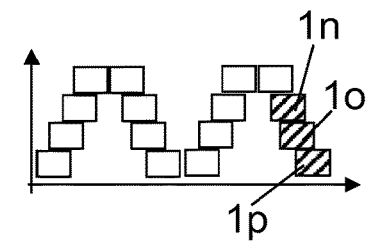
FIG. 3c illustrates the arrangement in the representation according to FIG. 1 at a third time of the animation.

FIG. 4c shows animation object 2 at a third point in time, which corresponds to 2000 ms after the start of the animation. At this third point the animation object 2 covers the points $1n'$, $1o'$ and $1p'$ in the virtual coordinate system. Accordingly, the control device controls the light sources $1n$, $1o$ and $1p$ associated with points $1n'$, $1o'$ and $1p'$ to emit light. This is indicated in FIG. 3c.

In FIG. 4a to FIG. 4c the movements of the animation object 2 are indicated by arrows 3.

LIST OF REFERENCE SIGNS $1a$ to $1p$ light sources
$1a'$ to $1p'$ points corresponding to the light sources in a virtual coordinate system
2 animation object 3 Arrow to illustrate the movements of the animation object

The invention claimed is:

1. A method for controlling a lighting device having a plurality of light sources, the method comprising the following method steps:
   describing an animation object in a virtual coordinate system with a description language using a string of numbers and letters corresponding to a plurality of parameters of the virtual coordinate system, wherein the description language describes a rotation of an animation object movement in at least one spatial dimension in the virtual coordinate system, and
   interpreting the animation object described in the description language by a control device controlling the plurality of light sources such that the light sources perform the animation object movement.

2. The method according to claim 1, wherein the animation object is described in the description language by at least two movements and a pause taking place between the movements.

3. The method according to claim 1, wherein the animation object corresponds to a shape in the virtual coordinate system which has properties including at least one of a filling and a brightness and a color and a texture.

4. The method according to claim 1, wherein a plurality of different animation objects are provided in the description language, each of which is assigned a unique identifier.

5. The method according to claim 1, wherein the description language includes a parameter used to describe a time within which a movement of the animation object is to be completed.

6. The method according to claim 1, wherein the description language includes a parameter used to describe a target position indicated in the virtual coordinate system to which the animation object is to be moved.

7. The method according to claim 1, wherein the description language includes a scale parameter used to describe a scaling of the animation object to be performed.

8. The method according to claim 1, wherein the description language includes a transition parameter used to describe a transition behavior with which a movement of the animation object is to be started and/or completed.

9. The method according to claim 1, wherein the control device for driving the plurality of light sources of the lighting device-comprises:
   a processor and a memory, wherein the control device interprets the animation object movement described in the description language and can control the plurality of light sources to perform the animation object movement.

10. A lighting device configured to control movement of an animation object in a virtual coordinate system, the lighting device comprising:
    a plurality of light sources;
    a control device comprising a processor and a memory; and
    an executable instruction stored in the memory, wherein the executable instruction includes the movement of the animation object described in a description language using a string of numbers and letters corresponding to a plurality of parameters in the virtual coordinate system;
    wherein the control device interprets the executable instructions and controls the plurality of light sources such that the light sources perform the movement of the animation object; and
    wherein the description language includes a scale parameter indicating whether the animation object should be scaled with respect to at least one of at least two spatial dimensions in the virtual coordinate system.

11. The lighting device according to claim 10, wherein the movement of the animation object is described in the description language by at least two movements and a pause taking place between the movements.

12. The lighting device according to claim 10, wherein the animation object corresponds to a shape in the virtual coordinate system which has properties including at least one of a filling and a brightness and a color and a texture.

13. The lighting device according to claim 10, wherein a plurality of different animation objects are provided in the description language, each of which is assigned a unique identifier.

14. The lighting device according to claim 10, wherein the description language includes a parameter used to describe a time within which a movement of the animation object is to be completed.

15. The lighting device according to claim 10, wherein the description language includes a parameter used to describe a target position indicated in the virtual coordinate system to which the animation object is to be moved.

16. The lighting device according to claim 10, wherein the scale parameter is used to describe whether the animation object to be scaled with respect to an x-coordinate of the virtual coordinate system, a y-coordinate of the virtual coordinate system, or a combination thereof.

17. The lighting device according to claim 10, wherein the description language includes a transition parameter used to describe a transition behavior with which a movement of the animation object is to be started and/or completed.

18. The lighting device according to claim 10, wherein the plurality of light sources comprise a plastic cover backlit by a light-emitting diode.

19. The lighting device according to claim 10, wherein the memory can store multiple animation objects.

20. The lighting device according to claim 10, wherein the control device is a microcontroller.

* * * * *